United States Patent [19]

Kimura et al.

[11] Patent Number: 4,764,807
[45] Date of Patent: Aug. 16, 1988

[54] CRT IMAGE PRINTING APPARATUS

[75] Inventors: Tsutomu Kimura; Yuji Oshikoshi, both of Tokyo; Kiichiro Sakamoto, Kanagawa, all of Japan

[73] Assignee: Fuji Photo Film Co., Ltd., Kanagawa, Japan

[21] Appl. No.: 62,643

[22] Filed: Aug. 16, 1987

[51] Int. Cl.[4] .............................................. H04N 1/46
[52] U.S. Cl. ...................................... 358/75; 355/43; 355/20; 355/27; 358/76
[58] Field of Search ...................... 355/43, 65, 66, 20, 355/27; 358/75, 76, 80, 244

[56] References Cited

U.S. PATENT DOCUMENTS

| | | | |
|---|---|---|---|
| 2,295,628 | 9/1942 | Biedermann | 358/76 |
| 2,385,681 | 9/1945 | Brick | 358/244 X |
| 3,475,096 | 10/1969 | Ooue et al. | 355/66 X |
| 4,230,407 | 10/1980 | Möller | 355/27 |
| 4,260,247 | 4/1981 | Bennett | 355/27 X |
| 4,633,305 | 12/1986 | Nakayama | 358/76 X |
| 4,712,909 | 12/1987 | Oshikoshi | 355/20 |

Primary Examiner—James J. Groody
Assistant Examiner—E. Anne Faris
Attorney, Agent, or Firm—Sughrue, Mion, Zinn, MacPeak & Seas

[57] ABSTRACT

A CRT image printing apparatus for making a color print from black-and-white images displayed on a black-and-white CRT corresponding to three color monochromatic images of a color image in three color frame sequential exposure system, comprises three color filters for converting the black-and-white images corresponding to three color monochromatic images to which a color photographic paper and a color photographic film are selectively sequentially exposed, and an image signal processor for changing the black-and-white images negative to positive when the color photographic film is selected to be exposed and positive to negative when the color photographic paper is selected to be exposed.

15 Claims, 8 Drawing Sheets

CRT IMAGE PRINTING APPARATUS

BACKGROUND OF THE INVENTION

The present invention relates to a CRT image printing apparatus and more particularly to an apparatus by which a CRT image can be selectively printed on a color photographic paper and a color photographic film.

In resent years, a CRT image printing apparatus for making prints is applied to make slides. This CRT printing apparatus comprises a black- and-white CRT for sequentially displaying black-and-white images corresponding to red, green, and blue monochromatic images of a color negative image of which the positive image is printed on a color reversal film. Each black and white image is converted into a corresponding monochromatic image with the aid of one of three color filters, namely red, green, and blue filters, which are selectively sequentially placed between the black-and-white CRT and the color reversal film. The color reversal film is exposed to the converted monochromatic images in a three color frame sequential exposure system.

In the field of color slide making, there are such varieties of requirements that customers wish to have alternations if finished slides are unsatisfied or adequate, to have prints as advance samples for color correction before making slides, and to have both prints and slides. However, there is no conventional CRT printing apparatus that can meet these requirements.

OBJECT OF THE INVENTION

It is therefore an object of the present invention to provide a CRT image printing apparatus which enables to selectively expose a color photographic paper and a color reversal film to images sequentially displayed on a CRT.

It is another object of the present invention to provide a CRT printing apparatus which can make color prints and color slides.

SUMMARY OF THE INVENTION

To achieve these and other objects, the CRT image printing apparatus according to the present invention comprises; CRT display means which display sequentially black-and-white images corresponding to three color monochromatic images of a color original image; means for converting the black-and-white images to three color monochromatic images sequentially for three colors; exposure means by which a color photographic paper is sequentially exposed to the three monochromatic black-and-white images; exposure means by which a color photographic film is sequentially exposed to the three monochromatic images; and means selectively enabling the two sequential exposure means.

The CRT is controlled to display a positive black-and-white images corresponding to the three color monochromatic images of the color original image when the exposure means for the photographic film is selected. The converting means comprises three color filters; red, green, and blue filters, and disposed in association with both of the two sequential exposure means to convert sequentially the black-and-white images to the monochromatic images.

According to a preferred embodiment of the present invention, the selection of sequential exposure means is made by changing exposing light path between a printing light path and a photographic light path. This changing of light path is effected by a reflection mirror to turn the light path at a right angle toward the sequential exposure means for color photograph which includes a filter element to reduce the red component of photographic light according to the difference between the light-sensitivities of the color photographic paper and film.

BRIEF DESCRIPTION OF THE DRAWINGS

The above and other obJects and features of the present invention will be more apparent Upon consideration of the following description taken in conjunction with the accompanying drawings in which elements designated by the same reference numerals represent identical or similar elements in construction and function throughout the drawings and wherein.

DETAILED DESCRIPTION OF THE INVENTION

Figure 1:
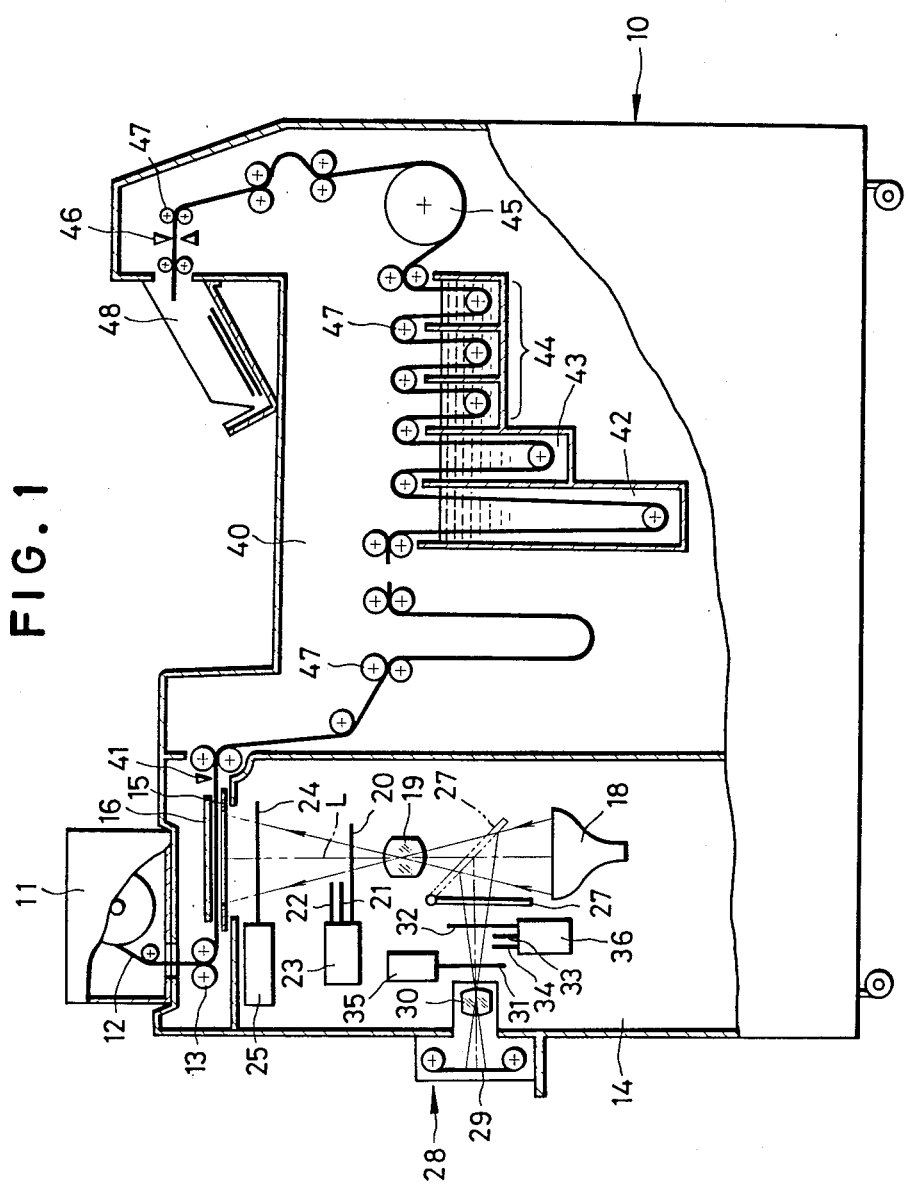
FIG. 1 is a partially sectional view showing a printer processor to which the CRT image printing apparatus is applied.

Referring to FIG. 1, a printer processor embodying the present invention comprises an exposure chamber 14 and a processing chamber 40 arranged in an apparatus housing 10. At the top on the left hand side of the housing 10, there is a photographic paper magazine 11 detachably mounted thereon wherein a roll of color photographic paper 12 is loaded. The color photographic paper 12 is intermittently withdrawn from the magazine 11 to an exposure position in the exposure chamber 14 by means of a pair of nip rollers 13, and is held flat between an exposure mask and a pressure plate 15, 16 at the exposure position.

In the exposure chamber 14, there is a black-and-white CRT ( which is hereinafter referred to a CRT for simplicity ) 18 disposed opposite to the exposure position. The CRT 18 sequentially displays black-and-white images in the form of a brightness distribution corresponding to three color monochromatic images; a red monochromatic image, a green monochromatic image, and a blue monochromatic image, of a negative image to be printed. The color photographic paper 12 is exposed for approximately one sec. to each of the three black-and-white images through each corresponding one of the color filters, red filter 20, green filter 21, and blue filter 22. These color filters 20 to 22 which are disposed between the exposure mask 15 and a printing lens 19 are controlled by a filter changeover control 23 to move into the optical path L of the printing lens 19 in sequence. For this printing lens 19, zoom lenses or lenses having different focal lengths mounted on a rotatable disk are available. Under the exposure position is a shutter 24 which is controlled by a shutter control 25 to open and close three times every exposure; namely once for each color, thereby performing a complete color printing.

Between the printing lens 19 and the CRT 18 is a reflection mirror 27 mounted on a pivot for pivotal movement. This reflection mirror 27 can pivotally move between two positions; a printing position and a photographic position. In the printing position, the reflection mirror 27 is out of the optical path L of the printing lens 19, allowing printing light to travel from the CRT 18 toward the color photographic paper 12. On the other hand, in the photographic position, the reflection mirror 27 is in the optical path L of the printing lens 19 and reflects the photographic light from the CRT 18 toward a camera unit 28. This camera unit 28 which is detachably mounted on the apparatus housing 10 has a color reversal film 29 therein which may be of the frame size of 35 mm or of 4×5 in, a taking lens 30 mounted thereon, and a shutter ( not shown ). Upon photographing an image on the CRT 18, this shutter is maintained open to allow three color seguential exposures at every time an image is photographed, which will be described later. It is permissible to replace the color reversal film with color negative films and to replace the camera unit with an instant photographic system well known in the art.

Between the camera unit 28 and the reflection mirror 27, there is another set of color filters 32 to 34 for red, green, and blue, which are selectively sequentially driven by a filter changeover control 36 to move into the light path L, and a shutter 31 which is controlled by a shutter control 35 to open and close.

Mounted within the processing chamber 40 in the apparatus housing 10 are a color development tank 42, a bleach-fix solution tank 43, a washing solution tank 44, a rotary dryer 45, and a cutter 46. A plurality of rollers 47 are disposed at suitable positions for conveying the color photographic paper 12 through the above-mentioned elements. After a predetermined number of images have been printed onto the color photographic paper 12, a cutter 41 disposed adjacent the exposure mask 15 is actuated to cut-the exposed color photographic paper 12. The exposed color photographic paper 12 is then subjected, within the processing chamber 40, to color development, bleaching and fixing, washing, and drying processes and thereafter, transported to the cutter 46. The developed color photographic paper 12 is cut into individual frames. Prints cut in units of one frame each are received by a tray 48.

Figure 2:
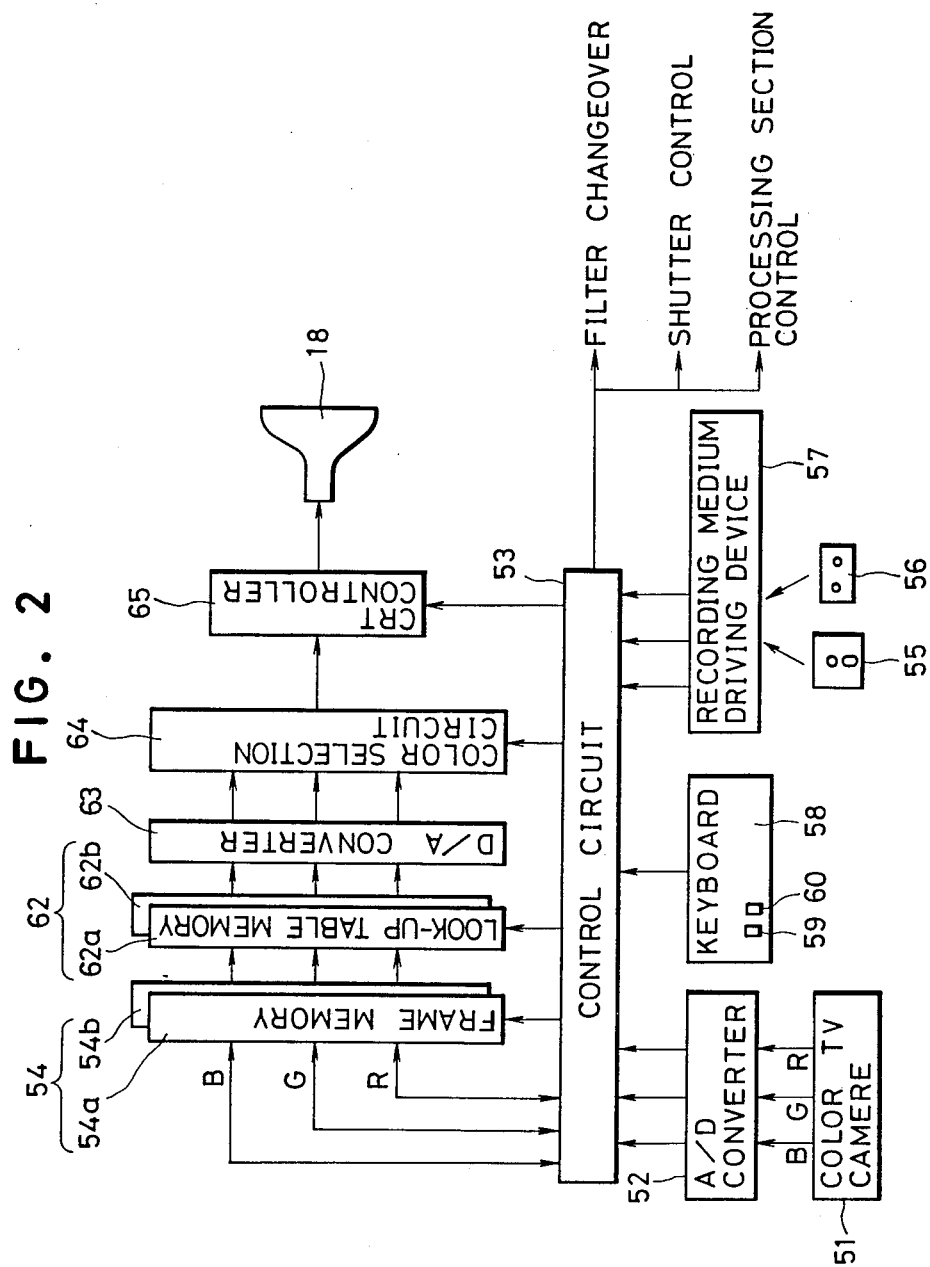
FIG. 2 is a block diagram showing a CRT control circuit.

Referring now to FIG. 2, there is shown a circuit in the form of a block diagram for use with the CRT image printing apparatus of FIG. 1. As a subject image input device, a TV camera 51 well known in the art per se may be used to enter an image to be displayed on the CRT 18 into the circuit. The color TV camera 50 can pick up the image to provide video signals separately for three colors; namely red, green, and blue, and transfer the video signals to A/D converter 52. These three color video signals, after having been converted into digital signals, are transmitted to a control circuit 53 wherein the three color video signals are subJected to a logarithmic transformation and a color correction ( masking processing ). After these signal processings, the video signals are transferred to a frame memory unit 54 and stored therein separately for three colors.

There is graphic image input means comprising a recording medium such as a floppy disk 55 or a magnetic tape 56, and a recording medium driving circuit 57. Through the recording medium driving circuit 57 computer graphic images (which are hereinafter referred to as CG images) and the like recorded on the floppy disk 55 or the magnetic tape 56 are read out and inputted into the control circuit 53. Alternatively, CG images may be inputted by the aid of digitizers well known in the art. The control circuit 53 can provide a composite image of the CG image and the subject image by electrically adding together the video signals of these images separately for picture elements. There is also a keyboard 58 including various functional keys through which various instructions are entered. Keys 59 and 60 are additionally provided on the keyboard 58 to start printing and photographing, respectively.

The frame memory 54 is comprised by two different frame memories 54a and 54b. Upon inputting video signals, the signals are written in the frame memory 54a through the control circuit 53; however written in the frame memory 54b are video signals of an image that is the mirror image of an original image such as a subject image or a CG image. For writing video signals in the frame memory 54b, video signals of an image are read out from the frame memory 54a and rewritten in the frame memory 54b in a inverted order of address in a scanning direction of the CRT 18. This is done in the control circuit 53 for the purpose of displaying an mirror image of the image on the CRT 18. Otherwise, it is permissible to read out the video signals from the frame memory 54a in a reversed order or to move a flying spot in a reversed direction on a fluorescent screen of the CRT 18 with respect to an ordinary scanning direction.

The video signals for each color, when printing, are retrieved from the frame memory 54 and transmitted to a look-up table memory unit 62 comprising a look-up table memory 62a for negative image and a table memory 62b for positive image. The look-up table memory 62a is used upon printing to process the video signals for a gradation correction in accordance with the characteristic of the color photographic paper 12 and for a positive-negative conversion. On the other hand, the look-up table memory 62b is used upon photographing to process the video signals for a gradation correction in accordance with the characteristic of the color reversal film 29.

The video signals for three colors from the look-up table unit 62 are again converted, by D/A converter 63 into analog video signals which in turn are transmitted to a color selection circuit 64. The color selection circuit 64 transmits to the CRT driving circuit 65 the video signals sequentially by color, thereby displaying on the CRT 18 black-and-white images in a brightness pattern corresponding to three monochromatic images in sequence.

Figure 3:
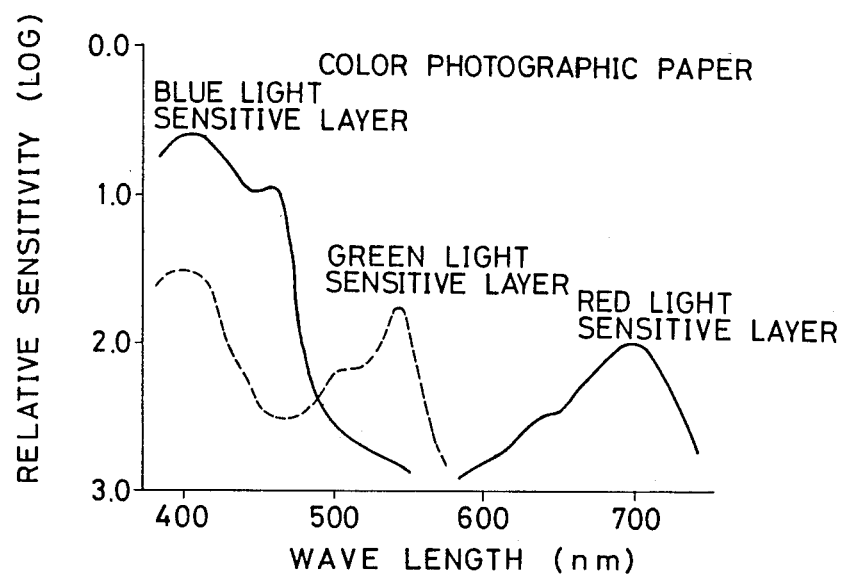
FIG. 3 is a graph showing the spectral sensitivity characteristic of a color photographic paper.
Figure 4:
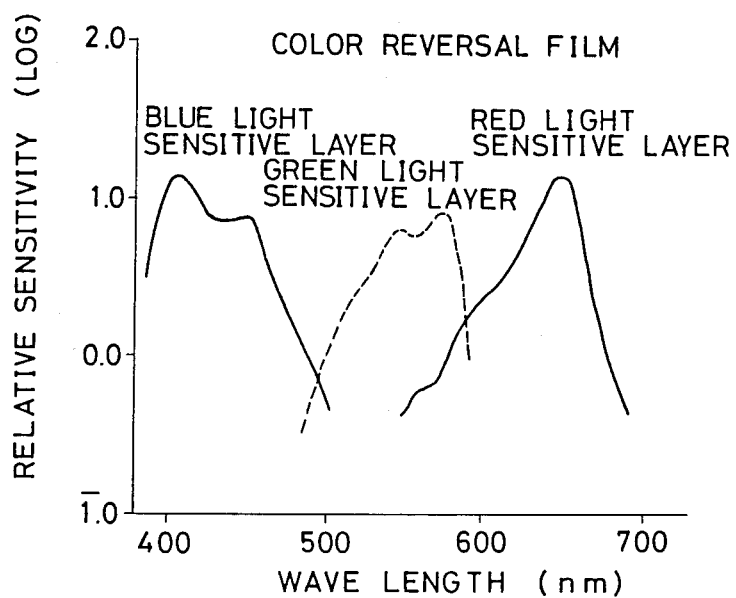
FIG. 4 is a graph showing the spectral sensitivity characteristic of a color photographic film.

FIGS. 3 and 4 show the speotral sensitivities of the color photographic paper 12 and the color reversal film 29, respectively. Apparently, the spectral sensitivity is different from each other in accordance with light-sensitive layers. The color reversal film 29 has a sensitivity as high as approximately ten times of the color photographic paper 12. Therefore, it is necessary to vary exposure time in accordance with light-sensitive layers and kinds of photosensitive materials.

Figure 6:
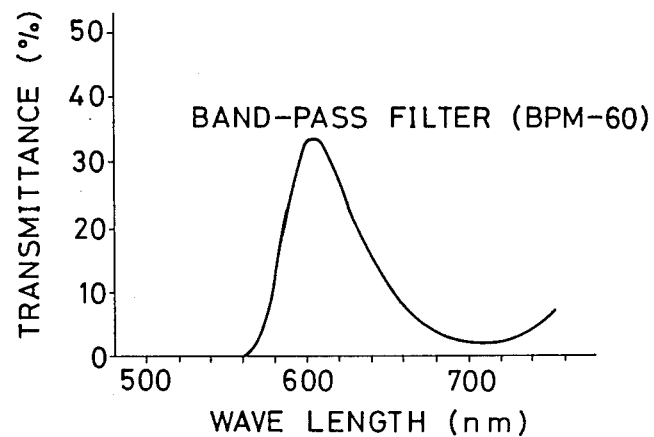
FIG. 6 is a graph showing the spectral transmittance of the band-pass filter.

As the red light-sensitive layer of the color photographic paper has a red light-sensitivity deflected aside to the range of infrared wavelengths, it is usual to expose the color photographic paper 12 to a red image on an ordinary black and white CRT for approximately one minute. For this reason, CRTs having a high luminance characteristic are used for the CRT 18. In this embodiment, the fluorescent screen of the CRT 18 contains a mixture of fluorescent substances of P45 and P22 in the ratio of 1:4 which exhibits the spectral luminance high in the wavelength range of red and low in the wavelength range of blue. By using the CRT 18 having a high spectral luminance in the wavelength range of red in combination with the color filters 20 to 22 which exhibit the spectral transmittance shown in FIG. 6, the exposure time for each color is considerably reduced to about one sec.

Figure 5:
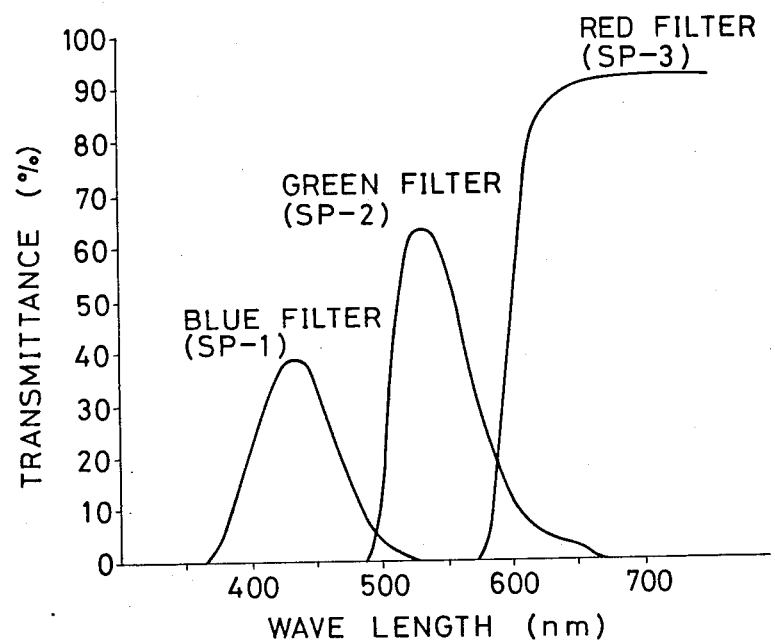
FIG. 5 is a graph showing the spectral transmittance of the color filters.

Since the sensitivity of the color reversal film 29, as is previously described, is as high as ten times of the color photographic paper 12, the color reversal film 29 will be over-exposed in the case that the spectraL luminance of the CRT 18 is determined based on the spectral sensitivities of the color photographic paper 12. For this reason, exposure for the color reversal film 29 is to be reduced to about one tenth of the exposure required to make a proper exposure for the color photographic paper 12. In order to reduce the exposure of the color reversal film 29, although a color filter with a low transmittance is available, nevertheless, in this embodiment, the color filters 32 to 34 which have the same transmittances as the color filters 20 to 22 shown in FIG. 5 are used for the economical reason. Therefore, for reducing the exposure, the CRT 18 is controlled to reduce its emission luminance to about one tenth of its rated emission luminance when photographing. Furthermore, since the color reversal film 29 has the red, green, and blue light-sensitive layers whose sensitivities are substantially equal to each other, the color reversal film 29 will be over-exposed for red in the case that the spectral luminance of the CRT 18 is determined based on the spectral sensitivity of the color photographic paper 12. For this reason, used in order to reduce the red component of photographic light is a band-pass filter (BPM-60) having the spectral characteristic shown in FIG. 6. This BPM-60 band-pass filter is cemented to a SP-3 color filter to form the red color filter 32. Otherwise, the BPM-60 band-pass filter may be provided separately from the red color filter 32 and placed in the photographic optical path simultaneous with the red color filter 32. It may be effective to use an ND filter, for example an ND-1 filter, in place of the BPM-60 filter.

A further understanding of the CRT image printing apparatus of the present invention will be had from the following description.

A subject image and/or a CG image, which are entered through the color TV camera 51, and the floppy disk 55 or the magnetic tape 56, are stored in the frame memory 54a separately for three colors after an image processing by the control circuit 53. More than one images are, if entered, electrically image-processed in the control circuit 53 to provide a composite image by operating appropriate keys of the keyboard 58. This image-processing as well as printing or photographing is performed while observing a video image to be processed on a monitor screen not shown.

When printing a video image, the print start key 59 of the keyboard 58 is operated. As the result of this operation of the print start key 59, three color video signals are read out from the frame memory 54a and transferred to the look-up table memory 62a wherein subjected to a positive-negative conversion and a gradation correction. Then the three color video signals are sent to the color selection circuit 64 after converted into analog signals by the D/A converter 63. There at first the red color video signals are selected and transferred to the CRT controller 65. The CRT controller 65 displays on the CRT 18 the red color video signals as a black and white image in a brightness pattern corresponding to the red monochromatic image of the subject image, the CG image, or the composite image thereof. During the CRT 18 displays the black-and-white image of the red monochromatic images, the filter changeover control 23 brings the red color filter 20 in the printing light path so as to change the black-and-white image on the CRT 18 to a red monochromatic image. Approximately simultaneously with this, the shutter control 25 opens the shutter 24 for a period of time, for example one sec., predetermined in accordance with the red light- sensitivity of the color photographic paper 12 to effect the exposure of the color photographic paper 12 to the changed red monochromatic image.

After the completion of exposure for red, the shutter control 25 closes the shutter 24 and, approximately simultaneously, the filter changeover control 23 replaces the red filter 20 with the green filter 21. At this time, the color selection circuit 64 selects green color video signals and sends them to the CRT controller 65 to display a black-and-white image corresponding to the green monochromatic image in just the same way as the black-and-white image of the red monochromatic image. In the same manner as for the red monochromatic image, the color photographic paper 12 is exposed to the green and blue monochromatic images in sequence. When the multiple exposure of the color photographic paper 12 is completed in the three color frame sequence exposure system, the nip rollers 13 advance the color photographic paper 12 by one frame and position an unexposed part thereof between the exposure mask 15 and the pressure plate 16.

The above-described operations are repeated as many times as required to print a number of frames of color images on the color photographic paper 12 frame by frame and the exposed part of the color photographic paper 12 is advanced into the processing chamber 40 to be temporarily stored therein. When a predetermined number of frames of color images are printed, the color photographic paper 12 is automatically cut off after the last frame by means of the cutter 41, and the exposed part of the color photographic paper 12 is proceeded automatically through the developing tank 42, the bleaching-fixing tank 43, and the washing tank 44 in that order for processing. The color photographic paper 12 thus processed is dried by the rotary dryer 45 and thereafter cut into individual frames. The prints cut in units are drawn off into the tray 48.

When photographing a video image displayed on the CRT 18 on the color reversal film 29 for, for instance, making slides, the start key 60 for photographing is operated. As the result of the operation of the start key 60, the control circuit 35 disables the printing systems including the filter control 23, the shutter control 25, and their associated elements, but enabling the photographic system including the shutter control 35, the filter control 36, and their associated elements as well as the camera unit 28. Therefore, the camera unit 28 makes the incorporated shutter operative in a bulb mode. Furthermore, the reflection mirror 27 is moved into the photographic position shown by a dotted line in FIG. 1 wherein the reflection mirror 27 is placed in the illumination light path L at 45 degrees in respect to the optical axis of the printing lens 19. On the other hand, the control circuit 53 reads out three color video signals from the frame memory 54a and convert them into video signals for a mirror image. The converted mirror image video signals are sent to the frame memory 54b and stored therein. Upon photographing, since the look-up table memory 62b for positive is selected, the mirror image video signals from the frame memory 54b are converted into positive video signals through the look-up table memory 62b and transferred to the D/A converter 63 for analog conversion. In just the same way as for printing, the analog video signals are sequentially displayed as positive mirror black-and-white images in the form of brightness distribution for three color monochromatic images on the CRT 18 whose emission luminance is, however, reduced to as low as one tenth of the rated emission luminance.

In the opening of the incorporated-shutter, the color filters 32 to 34 are selectively moved into the light path one by one in synchronism with the openings of the shutter 34. The shutter 34 is caused by the shutter control 35 to open for one sec. once every display of black-and-white image on the CRT 18. In such the way, when the multiple exposure of the color reversal film 29 is completed in the three color frame sequential exposure system, the color reversal film 29 is advanced by one frame by an incorporated motor in the camera unit 28 and an unexposed part of the color reversal film 29 is placed in an exposure position of the camera.

The above-described operations are repeatedly performed as many times as required to take a number of frames of color images on the color reversal film 29, the exposed color reversal film 29 is replaced with a new roll of color film. The color reversal film 29 thus exposed is thereafter developed in a well known manner.

Figure 7:
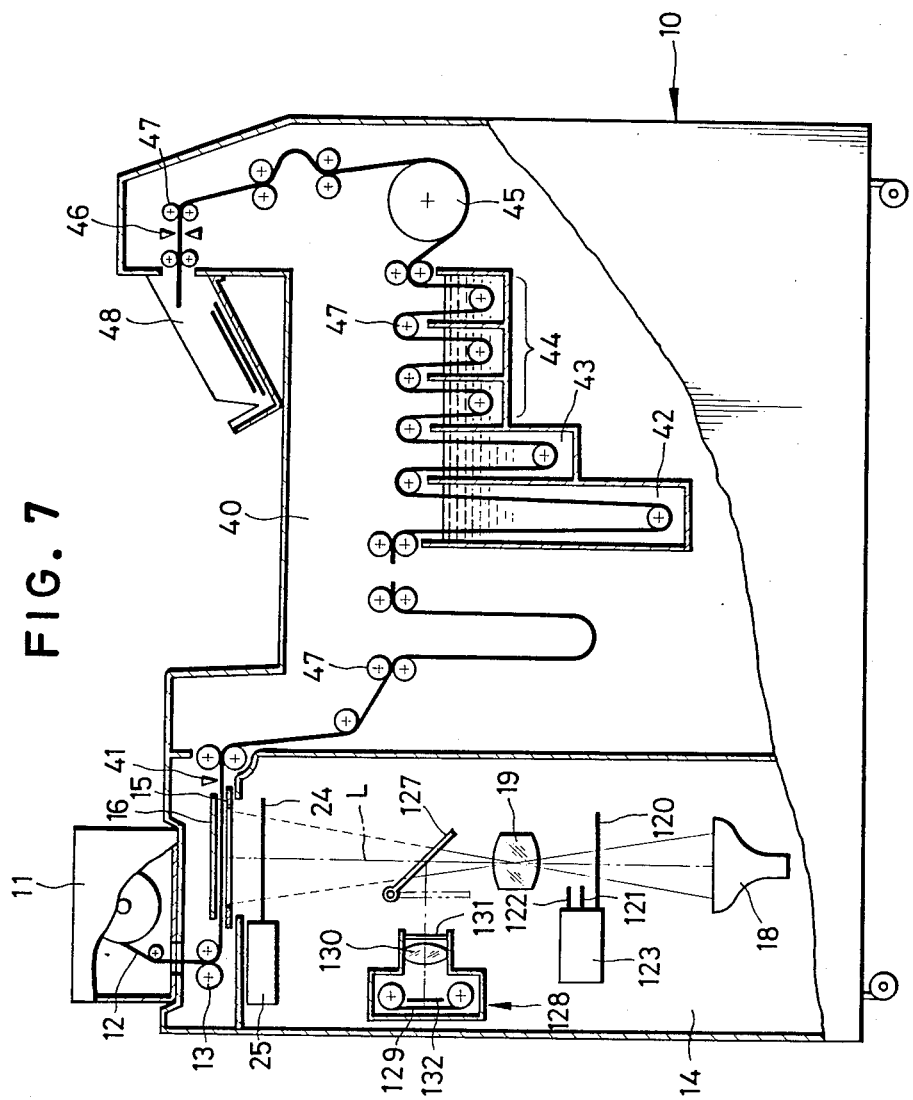
FIG. 7 is a partially sectional view of a printer processor to which the CRT image printing apparatus of an embodiment of the present invention is applied.

Referring to FIG. 7 showing a printer processor to which the CRT image printing apparatus of another embodiment of the present invention is applied, the CRT image printing apparatus being basically the same as the above-described embodiment excepting the provision of a single set of three color filters, there is disposed between the CRT 18 and the printing lens 19 a set of color filters, namely red filter 120, green filter 121, and blue filter 122, which are controlled by a filter changeover control 123 to move into the optical path L of the printing lens 19 sequentially one by one. Between the printing lens 19 and the shutter 24 is a reflection mirror 127 mounted on a pivot for pivotal movement. This reflection mirror 127 can move between two positions; a printing position and a photographic position. In the printing position, the reflection mirror 127 is out of the optical path L of the printing lens 19, allowing printing light to travel from the CRT 18 toward the color photographic paper 12 in the exposure position. On the other hand, in the photographic position, the reflection mirror 127 is in the optical path L and reflect illumination light from the CRT 18 toward a camera unit 128.

This camera unit 128 which is incorporated in the exposure chamber 14 of the apparatus housing 10, has a color reversal film 129 loaded therein, a taking lens 130 mounted therein, a color filter 131 such as LBB-8 filter or CC-40C filter placed in front of the taking lens 130, and a multiple exposure system for allowing three color frame sequential exposures every photographing which will be described later in detail in conjunction with FIG. 8. The color filter 131 functions to reduce the red color component of illumination light passing therethrough.

Figure 8:
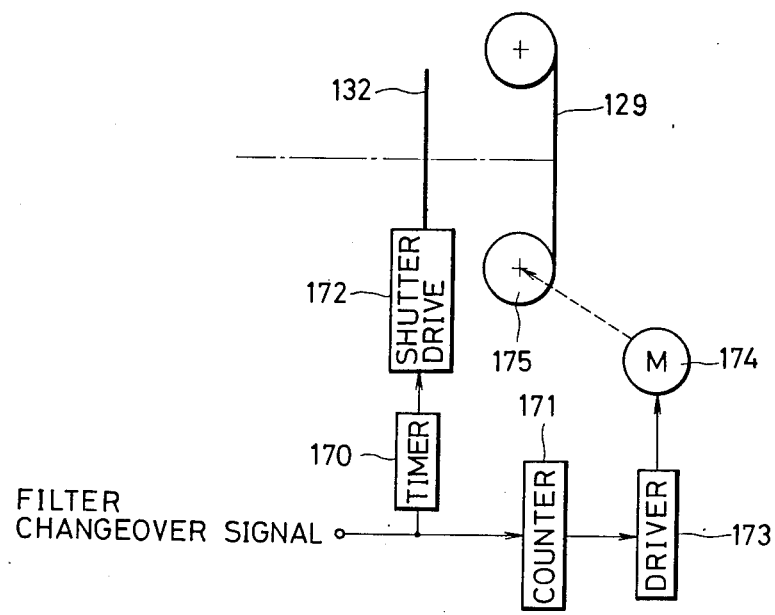
FIG. 8 is a block diagram showing a camera control.

Referring to FIG. 8 showing the multiple exposure system of the camera unit 28 which is controlled by the control circuit 53, a filter changeover signal is sent from the control circuit 53 to a timer 170 and a counter 171 both provided in the camera unit 128 as well as to the filter changeover control 123. The filter changeover signal is provided one every exposure, namely three signals in total every one frame exposure. The timer 170 is actuated once every filter changeover signal to cause the shutter drive 172 so as to open the shutter 132 for a predetermined period of time which depends on the sensitivity of the color reversal film 129 and the emission luminance of the CRT 18. The counter 171, when counting three filter changeover signals, actuates a motor 174 to start its rotation so as to make one frame advancement of the color reversal film 129.

According to this embodiment, the CRT image printing apparatus performs printing in the same manner as the CRT image printing apparatus of FIGS. 1 and 2. However, since the color filters 120 to 122 are used both upon printing and upon photographing, when the start key 60 for photographing is operated, the control circuit 35 disables only the shutter control 25 with its associated elements, but enables the camera unit 128 including the multiple exposure system. In synchronism with the filter changeover signal, the timer 170 is actuated to open the shutter 132 for 0.1 sec. so as to make an exposure of the color reversal film 129 to a black-and-white image displayed in the form of a brightness pattern on the CRT 18 through a selected color filter. When the color reversal film 129 is exposed to three monochromatic images in sequence and therefore the counter 171 counts three filter changeover signals, the driver 173 causes the motor 174 to start its rotation, thereby making one frame advancement of the color reversal film 129.

Figure 9:
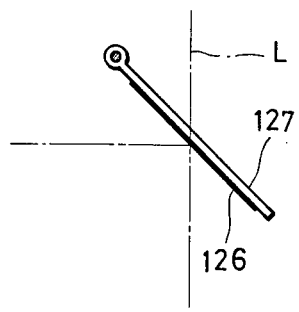
FIG. 9 is a side view of an example of the color filter and a reflection mirror.

The filter 131 can be replaced with a thin film color filter. As is shown in FIG. 9, on the reflection surface of the reflection mirror 127 of FIG. 7 is a thin filter layer 126 which reduces the red component of illumination light. This thin filter layer 126 is made by evaporation or spattering in a manner well known in the art, otherwise by attaching a thin film filter to the reflection mirror 127.

Figure 10:
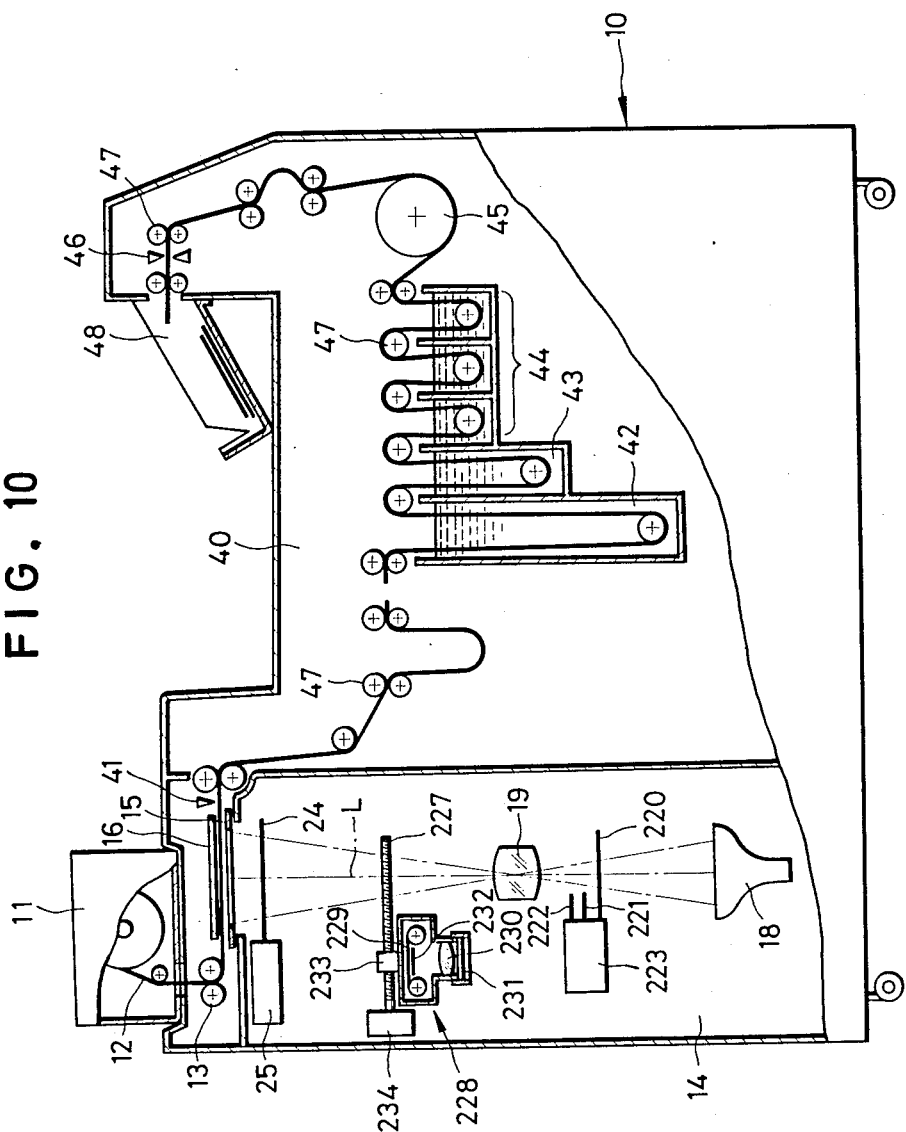
FIG. 10 is a partially sectional view of a printer processor to which the CRT image printing apparatus of another embodiment of the present invention is applied.
Figure 11:
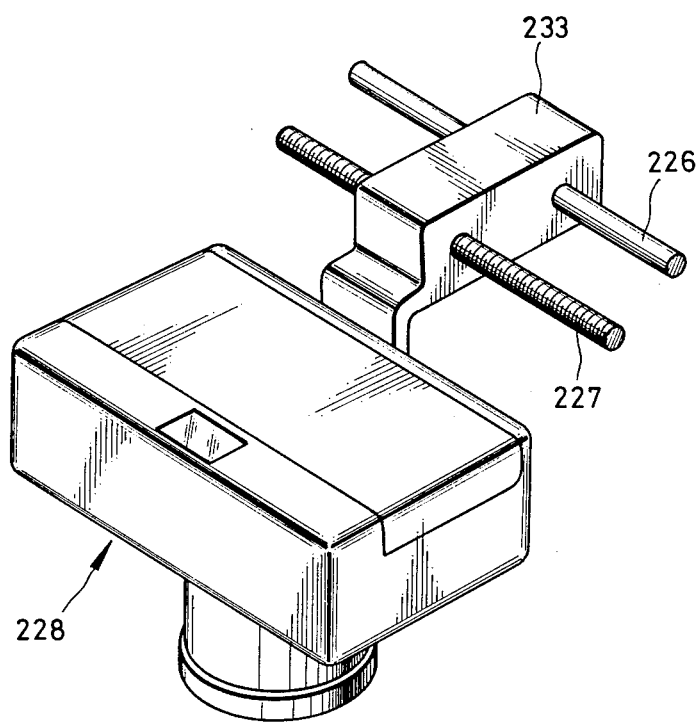
FIG. 11 is a perspective rear view of a camera unit used the printer processor of FIG. 10.

Reference is now had to FIGS. 10 and 11 showing still another embodiment of the present invention wherein a single set of three color filters 220 to 222 are provided between the CRT 18 and the printing lens 19 and the reflection mirror for turning the optical path L is omitted. In this embodiment, a camera unit 228 is provided and also has a color reversal film 229 loaded therein, a taking lens 230 mounted therein, a shutter 232 which is controlled by the multiple exposure system of FIG. 8, and a filter 231 functioning to reduce the red component of illumination light passing therethrough. This camera unit 228 is supported by a screw rod 227 and a guide rod 226 for transverse movement. As is clearly shown in FIG. 11, the camera unit 228 is attached to a sliding mount 233 which is slidably guided by the guide rod 226 and is threadingly engaged with the screw rod 227. The screw rod 227 is coupled to an output shaft of a motor 234 so as to be brought into rotation, thereby moving the sliding mount 233, and hence the camera unit 228 transversely in and out of the optical path L.

Although the CRT image printing apparatus of this embodiment is controlled by the same control circuit as of FIG. 2, it is not necessary to provide the frame memory 54b for the mirror image video signals because of the omission of a reflection mirror such as mirrors 27, 127 of FIGS. 1 and 7.

In operation, the CRT image printing apparatus of this embodiment is controlled in the same way as the CRT image printing apparatus of FIG. 2 excepting moving, in place reflection mirror 127 of FIG. 7, the camera unit 228 into the optical path L when the start key 60 is operated. After the movement of the camera unit 228, the same multiple exposure operation is repeated.

Although the present invention has been fully described by way of the preferred embodiments thereof with reference to the accompanying drawings, it is to be noted that various changes and modifications are apparent to those skilled in the art. Therefore, unless otherwise such changes and modifications depart from the true scope of the present invention, they should be construed as included therein.

What is claimed is:

1. A CRT image printing apparatus comprising:
   means including a black-and-white CRT for displaying black-and-white images corresponding to red, green, and blue monochromatic images of a color image sequentially for the three colors on said black-and-white CRT;
   means for converting said black-and-white images to three monochromatic images;
   means for sequentially exposing said converted monochromatic images on a color photographic paper in multiple exposure for making a print;
   means for sequentially exposing said converted monochromatic images on a color photographic film in multiple exposure for making a slide;
   means for selectively enabling said two sequential exposing means; and
   means for inverting said black-and-white images between negative and positive according to said selection of said two sequential exposure means.

2. An apparatus as defined in claim 1, wherein said converting means comprises red, green, and blue color filters.

3. An apparatus as defined in claim 1, wherein said black-and-white image is displayed in negative on said displaying means.

4. An apparatus as defined in claim 1, wherein said inverting means inverts an image negative to positive.

5. An apparatus as defined in claim 1, wherein said color photographic film exposing means includes means for decreasing the red component of light.

6. An apparatus as defined in claim 1, wherein said color photographic film exposing comprising at least multiple exposure means, and an automatic film advancing means.

7. An apparatus as defined in claim 1, wherein said selectively enabling means is a reflection mirror for turning exposure light at about a right angle.

8. An apparatus as defined in claim 6, wherein converting means comprising a single set of said red, green, and blue filter.

9. An apparatus as defined in claim 6, wherein said camera unit is detachably mounted on said apparatus and said converting means comprising two set of said red, green, and blue filters one set for each sequential exposure means.

10. An apparatus as defined in claim 9, further comprising a red light component decreasing means, said red light component decreasing means is a filter placed in front of said camera unit only upon the exposure of said red monochromatic images.

11. An apparatus as defined in claim 6, wherein said selectively enabling means comprises a driving mechanism for moving said camera unit into and out of said color photographic paper sequential exposure means.

12. A CRT image printing apparatus which comprising a black-and-white CRT for sequentially displaying black-and-white images color image to be printed; and three color filters of red, green, and blue for converting correspondingly said black-and-white images to three color monochromatic images to which a color photographic paper is exposed sequentially to make a color print, said apparatus comprising:
   a camera unit with a color photographic film loaded therein;
   a reflection mirror removably disposed between said black-and-white CRT and said color photographic paper for directing said black-and-white images toward said camera unit;
   filter means disposed between said reflection mirror and said color photographic film for reducing a red color component of light passing therethrough; and
   means for changing said black-and-white images displayed on said black-and-white CRT negative to positive when said reflection mirror is placed between said black-and-white CRT and said color photographic paper and positive to negative when removed therebetween.

13. An apparatus as defined in claim 12, wherein said color photographic film is a reversal film.

14. A CRT image printing apparatus which comprises a black-and-white CRT for sequentially displaying black-and-white images corresponding to three color monochromatic images of a color image to be printed; red, green, and blue color filters for converting correspondingly said black-and-white images to three color monochromatic images to which said color photographic paper is exposed sequentially to make a color print, said apparatus comprising:
   a camera unit including a color photographic film and a color filter for reducing a red component of light passing therethrough;
   means for removably placing said camera unit in front of said color photographic paper; and
   means for changing said black-and-white images negative to positive when said camera unit is placed in front of said color photographic paper and positive to negative when removed from a front of said color photographic paper.

15. An apparatus as defined in claim 14, Wherein said color photographic film is a reversal film.

* * * * *